United States Patent
Ferguson et al.

(10) Patent No.: US 7,026,277 B2
(45) Date of Patent: Apr. 11, 2006

(54) FABRIC CARE COMPOSITION

(75) Inventors: Paul Ferguson, Wirral (GB); Christopher Clarkson Jones, Wirral (GB); David Richard Arthur Mealing, Wirral (GB)

(73) Assignee: Unilever Home & Personal Care USA Division of Conopco, Inc., Greenwich, CT (US)

( * ) Notice: Subject to any disclaimer, the term of this patent is extended or adjusted under 35 U.S.C. 154(b) by 123 days.

(21) Appl. No.: 10/738,192

(22) Filed: Dec. 17, 2003

(65) Prior Publication Data

US 2004/0139554 A1 Jul. 22, 2004

(30) Foreign Application Priority Data

Dec. 20, 2002 (GB) .................................... 0229806

(51) Int. Cl.
*C11D 3/20* (2006.01)

(52) U.S. Cl. .................... 510/470; 510/473; 510/475; 427/213.3; 428/402.24; 428/403; 428/407; 525/54.2; 525/54.23; 525/54.26; 525/902; 523/201; 524/501; 524/504

(58) Field of Classification Search ............... 525/54.2, 525/54.23, 54.26, 902; 427/213.3; 428/402.34, 428/403, 407; 510/470, 473, 475; 523/201; 524/501, 504

See application file for complete search history.

(56) References Cited

U.S. PATENT DOCUMENTS

| | | | | |
|---|---|---|---|---|
| 3,809,664 A | * | 5/1974 | Fanta et al. ................ | 527/312 |
| 4,076,663 A | * | 2/1978 | Masuda et al. ........... | 525/54.31 |
| 4,115,474 A | * | 9/1978 | Vassiliades et al. ............ | 525/58 |
| 4,131,576 A | * | 12/1978 | Iovine et al. ............... | 527/312 |
| 5,067,565 A | * | 11/1991 | Holtmyer et al. ........ | 166/305.1 |
| 5,223,171 A | * | 6/1993 | Jost et al. ................... | 510/471 |
| 5,760,154 A | | 6/1998 | Krause et al. | |
| 6,224,981 B1 | | 5/2001 | Richard et al. | |
| 6,225,462 B1 | * | 5/2001 | Berry et al. .............. | 536/123.1 |
| 6,248,710 B1 | * | 6/2001 | Bijsterbosch et al. ....... | 510/470 |
| 6,764,992 B1 | * | 7/2004 | Kumar et al. ............... | 510/470 |

FOREIGN PATENT DOCUMENTS

| | | |
|---|---|---|
| EP | 1 002 810 | 5/2000 |
| EP | 1 306 632 | 5/2003 |
| EP | 0 936 224 | 7/2003 |
| WO | 99/36469 | 7/1999 |
| WO | 99/36470 | 7/1999 |
| WO | 00/18861 | 4/2000 |
| WO | 01/88075 | 11/2001 |
| WO | 03/010267 | 2/2003 |

OTHER PUBLICATIONS

*International Search Report No. PCT/EP 03/13641* dated Mar. 8, 2004, 4 pages.
Co-pending, Applicant: Ferguson et al., U.S. Appl. No. 10/210,153, filed Aug. 1, 2002, For: Treatment for Substrates (Equivalent to EP 01306632.9).

* cited by examiner

*Primary Examiner*—Margaret Einsmann
(74) *Attorney, Agent, or Firm*—Alan A. Bornstein

(57) ABSTRACT

The present invention is directed to a process for the preparation of polysaccharide grafted latex particles wherein the polysaccharide has β-1,4 linkages, wherein the process comprises core/shell emulsion polymerisation. Preferably, the process comprises a single step of preparing the latex particles by emulsion polymerisation of latex monomers with the simultaneous grafting of the polysaccharide.

25 Claims, No Drawings

FABRIC CARE COMPOSITION

TECHNICAL FIELD

The present invention relates to a process for the preparation of polysaccharide grafted particles using emulsion polymerisation and their uses, such as delivery to fabric during laundering.

BACKGROUND OF THE INVENTION

The deposition of a benefit agent onto a substrate, such as a fabric, is well known in the art. In laundry applications typical "benefit agents" include fabric softeners and conditioners, soil release polymers, sunscreens; and the like. Deposition of a benefit agent is used, for example, in fabric treatment processes such as fabric softening to impart desirable properties to the fabric substrate.

Conventionally, the deposition of the benefit agent has had to rely upon the attractive forces between the oppositely charged substrate and the benefit agent. Typically this requires the addition of benefit agents during the rinsing step of a treatment process so as to avoid adverse effects from other charged chemical species present in the treatment compositions. For example, cationic fabric conditioners are incompatible with anionic surfactants in laundry washing compositions.

Such adverse charge considerations can place severe limitations upon the inclusion of benefit agents in compositions where an active component thereof is of an opposite charge to that of the benefit agent. For example, cotton is negatively charged and thus requires a positively charged benefit agent in order for the benefit agent to be substantive to the cotton, i.e. to have an affinity for the cotton so as to absorb onto it. Often the substantivity of the benefit agent is reduced and/or the deposition rate of the material is reduced because of the presence of incompatible charged species in the compositions. However, in recent times, it has been proposed to deliver a benefit agent in a form whereby it is substituted onto another chemical moiety which increases its affinity for the substrate in question.

WO 99/36469 is directed to a polysaccharide conjugate capable of binding cellulose. Locust bean gum (LBG) is grafted to proteins, such as enzymes or anti-bodies or perfume loaded particles. This is delivered to the fabric during the laundering. The LBG attachment is achieved by enzymatic oxidation of the LBG using galactose oxidase to introduce aldehyde groups. These aldehyde groups are then reacted with glucose oxidase (using sodium cyanoborohydride) to form an LBG with chemically bound glucose oxidase. This procedure for preparing the material is cumbersome and involves numerous steps using 'conventional' organic (enzymatic) chemistry, such as purification of LBG, introducing aldehyde functionality to the LBG and coupling of this to an enzyme (via the enzymes hydroxyl functionality).

WO 99/36470 is also directed to polysaccharide conjugates that are able to bind cellulose, where the polysaccharide is attached to a particle containing perfume. The particle may be a range of materials, including silica. Perfume is allowed to infuse into macroporous silica particles simply by absorption, adsorption, impregnation and encapsulation. The polysaccharide, e.g. LBG, is then merely added onto the perfumed particles and is physically adsorbed onto the particle surface. The LBG aids deposition in a wash environment. Alternatively, chemical attachment may occur by enzymatic oxidation of polysaccharide side chains European patent application number 01306632.9 is directed to a water dispersible particle comprising a deposition enhancing part of one or more polymeric units and a benefit agent attached to the deposition enhancing part characterised in a particle size of 20 to 5,000 nm. Preferably the deposition aid must have a hydrolysable group (based on esters), such as Cellulose Mono-Acetate (CMA). The modified particles are prepared by reaction of acid functional beads by a cumbersome multi-step 'conventional' organic chemistry technique. This requires several time consuming (and commercially nonviable for high volume production) centrifugation stages and the preparation of an amine functional CMA by reaction of CMA with ethylene diamine using carbonyl diimidazole as coupling agent. The amine functional CMA is then reacted with acid functional beads (obtained externally) using ethyl dimethyl aminopropyl carbodimide as coupler. This results in CMA grafted particles which exhibit enhanced wash deposition.

WO-A-00/18861 provides a water-soluble or water-dispersible material for deposition onto a substrate during a treatment process, wherein the material comprises:
  (i) a deposition enhancing part having a polymeric backbone; and
  (ii) a benefit agent group attached to the deposition enhancing part by a hydrolytically stable bond;

such that the material undergoes during the treatment process, a chemical change which does not involve the hydrolytically stable bond and by which change the affinity of the material onto the substrate is increased. The preferred materials are substituted polysaccharides.

Thus, all the prior art is directed to the use of 'conventional' organic synthesis techniques to add the polysaccharide to the benefit agent. Such routes are cumbersome and many require numerous centrifugation stages to isolate and purify the final modified material. Such routes would not be commercially viable for the production of large volumes of materials.

Emulsion polymerisation techniques are described in "Emulsion Polymerisation and Emulsion Polymers", P. A. Lovell and M. S. El-Aasser (eds.), John Wiley and Son Ltd (1997). Core/shell emulsion polymerisation techniques are described in L. W. Morgan, *J. Appl. Polym. Sci.*, 27, 2033 (1982), V. L. Dimonie, A. Klein, M. S. El-Aasser and J. W. Vanderhoff, *J. Polym. Sci., Polym. Chem.*, 22, 2197 (1984), D. I. Lee, in "*Emulsion Polymers and Emulsion Polymerisation*" D. R. Bassett and A. E. Hamielec (eds.), ACS Symposium Ser., No. 165, p. 405 (1981) and W. D. Hergeth, K. Schmutzler and S. Wartewig, *Makromol. Chem., Macromol. Symp.*, 31, 123 (1990).

Core/shell latex particles are usually prepared by a series of consecutive emulsion polymerisation sequences with different monomer types, where the second (third, etc.) stage monomer is polymerised in the presence of "seed" latex particles. These seed latex particles may be prepared in a separate step, or formed in situ during the emulsion polymerisation. The resulting latexes are commonly referred to as "core/shell" latexes, implying a particle structure with the initially polymerised polymer located at the centre of the particle, and the later-formed polymer(s) becoming incorporated into the outer shell layer.

Such core/shell latexes are utilised in end-use applications such as architectural and automotive coatings, as impact modifiers in advanced engineering plastics to improve the impact strength and toughness, in adhesives to provide an optimum peel strength, and in many other high-value-added products in areas such as membrane separation and biotechnology.

SUMMARY OF THE INVENTION

A first aspect of the invention is a process for the preparation of polysaccharide grafted latex particles wherein the polysaccharide has β-1,4 linkages, wherein the process comprises core/shell emulsion polymerisation.

Preferably, the process comprises a single step of preparing the latex particles by emulsion polymerisation of latex monomers with the simultaneous grafting of the polysaccharide. Optionally, the polysaccharide grafted particle may contain an additional benefit agent.

According to a second aspect of the invention, there is provided a method of treating fabric, preferably cotton, comprising the use of the grafted polysaccharide obtainable by the above process.

According to a third aspect of the invention, there is provided the use of a polysaccharide grafted particle as defined above in the treatment of fabric, preferably cotton, to provide a stiffening effect to the fabric.

According to a fourth aspect of the invention, there is provided a polysaccharide grafted latex particle wherein the polysaccharide has β-1,4 linkages and the latex monomers are suitable for free radical aqueous emulsion polymerisation and contain at least one ethylenically unsaturated group capable of undergoing addition polymerisation.

According to a fifth aspect of the invention there is provided a laundry treatment composition comprising the polysaccharide grafted particle defined above.

DETAILED DESCRIPTION OF THE INVENTION

The present invention is directed to an emulsion polymerisation technique for preparing polysaccharide grafted particles, preferably latex particles. The particles may contain additional benefit agents and/or act as the benefit agent itself.

Core/shell emulsion polymerisation techniques are employed in the present invention. Such emulsion polymerisation procedures are well known industrially and lend themselves to easy commercial, high volume production. However, the use of emulsion polymerisation, in particular core/shell, synthesis techniques for the attachment of polysaccharides to latex particles and in applications such as subsequent delivery to cotton during laundering has not been contemplated before.

Preferably, the process comprises a single step of preparing the latex particles by emulsion polymerisation with the simultaneous grafting of the polysaccharide.

Preferably, the polysaccharide is present at levels between 0.1% to 10% w/w of the latex monomer, preferably 2% w/w of monomer.

In a preferred embodiment, the particle core is prepared by polymerising between 50 and 99.9% of a latex monomer. The remaining latex monomer is added along with initiator and the polysaccharide, to give a shell containing polysaccharide grafts at the latex particle surface.

This process gives a simple 'one pot' route for preparing the latex particle with the simultaneous grafting of the polysaccharide, in a single step. Thus, the present invention provides a simple commercial route to preparing latex particles, which may contain additional benefit agent, with surface grafted polysaccharide chains. Numerous synthetic routes could have been chosen to attach polysaccharides to the latex particles. The timing of the addition of the polysaccharide during emulsion polymerisation was found to be important and results in high deposition of the particles during laundering. This result was surprising because if all polysaccharide was added at the beginning of the polymerisation or at the end delivery during laundering was poor. Such particles have been found to deposit during the main wash onto fabric, preferably cotton, at levels of ten to fifteen times greater than non-polysaccharide control particles. Thus, the polysaccharide should be added during the preparation of the particles. The addition of the polysaccharide particles after polymerisation occurs will not provide such great deposition benefits.

Preferably, the weight percent of monomer polymerised to form the core before the remaining monomer and polysaccharide is added, can be varied between 50 and 99.9%, with the preferred level being 75%.

The Polysaccharide

The polysaccharide is preferably $\beta_{1-4}$ linked and is a cellulose, a cellulose derivative, or another $\beta_{-1,4}$-linked polysaccharide having an affinity for cellulose, such as mannan and glucomannan. Preferably, the polysaccharide is locust bean gum. Alternatively, the polysaccharide may be chosen from xyloglucan, guar gum or tara gum.

The polysaccharide acts as a delivery aid/deposition aid.

Preferably, the polysaccharide has only $\beta_{1,4}$ linkages. Optionally, the polysaccharide has linkages in addition to the $\beta_{1,4}$ linkages, such as $\beta_{1,3}$ linkages. Thus, optionally some other linkages are present. Polysaccharide backbones which include some material which is not a saccharide ring are also within the ambit of the present invention (whether terminal or within the polysaccharide chain).

The polysaccharide may be straight or branched. Many naturally occurring polysaccharides have at least some degree of branching, or at any rate at least some saccharide rings are in the form of pendant side groups (which are therefore not in themselves counted in determining the degree of substitution) on a main polysaccharide backbone.

A polysaccharide comprises a plurality of saccharide rings which have pendant hydroxyl groups. Substituted or modified polysaccharides may be used. In the substituted polysaccharides of the present invention, at least some of these hydroxyl groups are independently substituted by, or replaced with, one or more other substituents such as, but not limited to, thiols or hydrocarbons. The "average degree of substitution" for a given class of substituent means the average number of substituents of that class per saccharide ring for the totality of polysaccharide molecules in the sample and is determined for all saccharide rings. An example of a substituted polysaccharide is hydroxyethyl cellulose.

Optionally, the β-1,4 polysaccharide can be chemically reacted to add thiol or hydrophobe chain functionality, prior to use in the emulsion polymerisation process. Such modifications lead to an increase in the level of polysaccharide material which becomes grafted to the particles.

The addition of a thiol group onto the polysaccharide converts the polysaccharide to a chain transfer agent. Chain transfer agents contain very labile hydrogen atoms that are easily abstracted by a propagating polymer chain. This terminates the polymerisation of the growing polymer, but generates a new reactive site on the chain transfer agent. In this case, polysaccharide is the chain transfer agent and the reactive site generated can then initiate further polymerisation, and in doing so, ensures covalent attachment of the polysaccharide to the ends of the polymer chain. This results in an overall reduction in the molecular weight of the polymer obtained and increases the level of grafted polysaccharide chains attached to the particles. This increase in polysaccharides grafts results in higher particle delivery during laundering.

Similarly, modification to add a hydrophobe to the polysaccharide functions to increase grafting to the particles. The polysaccharide is water soluble and the covalently attached hydrophobe is water insoluble and this imparts surfactant properties to the modified material. This polysaccharide surfactant can then be used at the beginning of the emulsion polymerisation as a co-surfactant with the other surfactants used in the preparation. At the beginning of the polymerisation, the surfactants form micelles that function to solubilise some of the monomer within their interior. As polymerisation proceeds, the monomer is converted to polymer and the particles grow, the hydrophobic chain of the polysaccharide becomes physically embedded in the particle centre. Such hydrophobe embedding results in a substantial increase in the level of polysaccharide attached to the particle at the end of the polymerisation, with subsequent increase in particle delivery during laundering.

Thiol functionality can be added to the polysaccharide by reaction of a thiol functional compound that contains additional functionality capable of reacting with the hydroxyl groups of the polysaccharide, either independently or in conjunction with a coupling agent. The preferred reagent for introducing the thiol group is thiobutyrolactone.

Hydrophobic chain functionality can be added to the polysaccharide by reaction with a hydrocarbon chain that contains one functional group at the chain end which is capable of reaction with the hydroxyl groups of the polysaccharide, independently or in conjunction with a coupling agent. Preferably the hydrocarbon chain contains from 6 to 30 carbon atoms, more preferably 12 to 18 carbon atoms, and most preferred 12 carbon atoms. An example is lauric acid, which is attached to the polysaccharide by means of a coupling agent, such as diisopropyl carbodiimide.

The modified polysaccharides outlined above may be used in accordance with the process of the present invention. The use of such modified polysaccharide results in good and even better deposition levels in the resultant polysaccharide grafted latex particles.

The Latex Particle

The term "latex" or "latex particle" used herein is defined as a stable colloidal dispersion of a polymeric substance in an aqueous medium. The polymer particles are usually approximately spherical and of typical colloidal dimensions. Particle diameters may range from about 30 to 500 nm. (The Encyclopedia of Polymer Science and Engineering, Second Edition, Volume 8, Page 647, John Wiley and Sons Inc. (1987)).

Preferably, the latex monomers is a monomer suitable for free radical aqueous emulsion polymerisation and contain at least one ethylenically unsaturated group capable of undergoing addition polymerisation.

Examples of latex monomers include olefins, ethylene, vinylaromatic monomers such as styrene, α-methylstyrene, o-chlorostyrene or vinyltoluenes, esters of vinyl alcohol and monocarboxylic acids, such as vinyl acetate, vinyl propionate, vinyl n-butyrate, vinyl laurate and vinyl stearate, esters of α,β-monoethylenically unsaturated mono- and dicarboxylic acids, such as acrylic, methacrylic, maleic, fumaric and itaconic acid, with alcohols, such as methyl, ethyl, n-butyl, isobutyl and 2-ethylhexyl alcohol, dimethyl or di-n-butyl maleate, nitriles of α,β-monoethylenically unsaturated carboxylic acids, such as acrylonitrile, and conjugated dienes, such as 1,3-butadiene and isoprene. Preferred monomers include vinyl acetate, methacrylate and styrene For aqueous emulsion polymerisation, these monomers generally form the principal monomers which, based on the total amount of monomers to be polymerised, normally account for a proportion of more than 50% by weight. These monomers are all monomers which are only sparingly soluble in water and are usually the main monomers used.

Preferably, the solubility of these monomers in water under standard conditions (25° C., 1 atm) is moderate to poor. Examples of monomers having greater solubility in water are α,β-monoethylenically unsaturated monocarboxylic and dicarboxylic acids and their amides, such as acrylic acid, methacrylic acid, maleic acid, fumaric acid, itaconic acid, acrylamide, methacrylamide, poly (alkylene oxide) monoacrylates and monomethacrylates, vinyl-sulfonic acid and its water-soluble salts, and N-vinyl-pyrrolidone. Such monomers are normally copolymerized only as modifying monomers, in amounts, based on the total amount of the monomers to be polymerized, of less than 30% by weight.

Monomers which internally crosslink the emulsion latex particle can also be incorporated during the polymerisation. Such crosslinkers have at least two non-conjugated ethylenically unsaturated double bonds. Examples are alkylene glycol diacrylates and dimethacrylates such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, and triallyl cyanurate. These monomers are copolymerized mostly in amounts of from 0.5 to 10% by weight, based on the total amount of monomers to be polymerized.

The latex particle if applied to the fabric during laundering may provide a stiffening/starch effect to the fabric.

The Benefit Agent

Preferably, the polysaccharide grafted latex particle may contain an additional benefit agent when used in laundering. The benefit agent groups may be selected from any group that is used to impart desirable properties to the substrate it is applied to.

The fabric benefit agent may be selected from the following a fabric softener, lubricants, ease of ironing aids, crease reduction agents, fluorescers, sunscreens, photofading inhibitors, fungicides, insect repellents.

The latex particle itself may act as the benefit agent and can improve the drape of fabric.

Other Substituents

Other substituents include initiators and chain transfer agents.

The initiator is a chemical or chemicals capable of forming free radicals in an aqueous environment. Free radicals can be formed either by homolytic scission (i.e. homolysis) of a single bond or by single electron transfer to or from an ion or molecule (e.g. redox reactions). Preferably, the initiator is a water-soluble initiator.

Homolysis is achieved by the application of heat (typically 50–100° C.). Some examples of initiators in this class are those possessing peroxide (—O—O—) or azo (—N=N—) groups, such as benzoyl peroxide, t-butyl peroxide, hydrogen peroxide, azobisisobutyronitrile and ammonium persulphate. Homolysis can also be achieved by the action of radiation (usually ultraviolet), in which case it is termed photolysis. Examples are the dissociation of 2,2'-azobis (2-cyanopropane) and the formation of free radicals from benzophenone and benzoin.

Redox reactions can also be used to generate free radicals. In this case an oxidising agent is reacted with a reducing. Some examples of appropriate pairs are ammonium persulphate/sodium metabisulphite and cumyl hydroperoxide/ferrous ion. The preferred redox couple is hydrogen peroxide/ascorbic acid that is used at levels (for each component) of 0.1 to 5% w/w on monomer. More preferably, the level is 1 to 3% w/w on monomer.

The initiator may be selected from the following benzoyl peroxide, t-butyl peroxide, hydrogen peroxide, azobisisobutyronitrile, ammonium persulphate, 2,2'-azobis (cyanopropane), benzophenone, benzoin, ammonium persulphate/sodium metabisulphite mixture, cumyl hydroperoxide/ferrous ion mixture and/or asorbic acid/hydrogen peroxide mixture.

Chain transfer agents are used to reduce the degree of polymerisation and hence final molecular weight of the polymer. They contain very labile hydrogen atoms that are easily abstracted by a propagating polymer chain. This terminates the polymerisation of the growing polymer, but generates a new reactive site on the chain transfer agent that can then proceed to initiate further polymerisation of the remaining monomer. They most commonly contain thiol (mercaptan) functionality and can be represented by the general chemical formula RS—H, such as n-dodecyl mercaptan and 2-mercaptoethanol. The preferred chain transfer agent is monothioglycerol that is used at levels, preferably from 0 to 5% w/w based on the monomer and more preferably at 0.25% w/w based on monomer.

The Polysaccharide Grafted Latex Particle

The polysaccharide acts as a deposition aid/delivery agent.

When used in laundering, the polysaccharide grafted latex particle deposits onto the fabric, preferably cotton, at higher levels than non-polysaccharide particles. The polysaccharide grafted latex particle may be used in the treatment of fabric, preferably cotton. Such treatment may provide a stiffening or crispness effect to the fabric. When additional benefit agents are used, additional properties depending on the benefit agent used will be imparted to the fabric. Alternatively, the polysaccharide grafted latex particle may be incorporated into a laundry treatment composition and used in the treatment of fabric, preferably cotton.

The polysaccharide grafted latex particles produced according to the present invention may also be used as stiffening finishes or drape modifiers for the textile finishing industry, as binders for paper and card production, as performance enhancers for wood and paper adhesives and as self-priming agents for wood paints. Thus, applications other than in the fabric care field are contemplated by the present invention, including use in the paper or textile finishing industry.

Laundry Treatment Compositions

The polysaccharide grafted particles may be incorporated into laundry compositions.

The polysaccharide grafted particles are typically included in said compositions at levels of from 0.001% to 10% by weight, preferably from 0.005% to 5%, most preferably from 0.01% to 3% by weight of the total composition.

The active ingredient in the compositions is preferably a surface active agent or a fabric conditioning agent. More than one active ingredient may be included. For some applications a mixture of active ingredients may be used.

The compositions of the invention may be in any physical form e.g. a solid such as a powder or granules, a tablet, a solid bar, a paste, gel or liquid, especially, an aqueous based liquid. In particular the compositions may be used in laundry compositions, especially in liquid, powder or tablet laundry composition.

The compositions of the present invention are preferably laundry compositions, especially main wash (fabric washing) compositions or rinse-added softening compositions. The main wash compositions may include a fabric softening agent and rinse-added fabric softening compositions may include surface-active compounds, particularly non-ionic surface-active compounds, if appropriate.

The detergent compositions of the invention may contain a surface-active compound (surfactant) which may be chosen from soap and non-soap anionic, cationic, non-ionic, amphoteric and zwitterionic surface-active compounds and mixtures thereof. Many suitable surface-active compounds are available and are fully described in the literature, for example, in "Surface-Active Agents and Detergents", Volumes I and II, by Schwartz, Perry and Berch.

The preferred detergent-active compounds that can be used are soaps and synthetic non-soap anionic and non-ionic compounds.

The compositions of the invention may contain linear alkylbenzene sulphonate, particularly linear alkylbenzene sulphonates having an alkyl chain length of $C_8$–$C_{15}$. It is preferred if the level of linear alkylbenzene sulphonate is from 0 wt % to 30 wt %, more preferably 1 wt % to 25 wt %, most preferably from 2 wt % to 15 wt %.

The compositions of the invention may contain other anionic surfactants in amounts additional to the percentages quoted above. Suitable anionic surfactants are well-known to those skilled in the art. Examples include primary and secondary alkyl sulphates, particularly $C_8$–$C_{15}$ primary alkyl sulphates; alkyl ether sulphates; olefin sulphonates; alkyl xylene sulphonates; dialkyl sulphosuccinates; and fatty acid ester sulphonates. Sodium salts are generally preferred.

The compositions of the invention may also contain non-ionic surfactant. Nonionic surfactants that may be used include the primary and secondary alcohol ethoxylates, especially the $C_8$–$C_{20}$ aliphatic alcohols ethoxylated with an average of from 1 to 20 moles of ethylene oxide per mole of alcohol, and more especially the $C_{10}$–$C_{15}$ primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (glucamide).

It is preferred if the level of non-ionic surfactant is from 0 wt % to 30 wt %, preferably from 1 wt % to 25 wt %, most preferably from 2 wt % to 15 wt %.

Any conventional fabric conditioning agent may be used in the compositions of the present invention. The conditioning agents may be cationic or non-ionic. If the fabric conditioning compound is to be employed in a main wash detergent composition the compound will typically be non-ionic. For use in the rinse phase, typically they will be cationic. They may for example be used in amounts from 0.5% to 35%, preferably from 1% to 30% more preferably from 3% to 25% by weight of the composition.

Suitable cationic fabric softening compounds are substantially water-insoluble quaternary ammonium materials comprising a single alkyl or alkenyl long chain having an average chain length greater than or equal to $C_{20}$ or, more preferably, compounds comprising a polar head group and two alkyl or alkenyl chains having an average chain length greater than or equal to $C_{14}$. Preferably the fabric softening compounds have two long chain alkyl or alkenyl chains each having an average chain length greater than or equal to $C_{16}$. Most preferably at least 50% of the long chain alkyl or alkenyl groups have a chain length of $C_{18}$ or above. It is preferred if the long chain alkyl or alkenyl groups of the fabric softening compound are predominantly linear.

Quaternary ammonium compounds having two long-chain aliphatic groups, for example, distearyldimethyl ammonium chloride and di(hardened tallow alkyl) dimethyl ammonium chloride, are widely used in commercially available rinse conditioner compositions. Other examples of these cationic compounds are to be found in "Surfactants Science Series" volume 34 ed. Richmond 1990, volume 37 ed. Rubingh 1991 and volume 53 eds. Cross and Singer 1994, Marcel Dekker Inc. New York".

Any of the conventional types of such compounds may be used in the compositions of the present invention.

The fabric softening compounds are preferably compounds that provide excellent softening, and are characterised by a chain melting Lβ to Lα transition temperature greater than 25° C., preferably greater than 35° C., most preferably greater than 45° C. This Lβ to Lα transition can be measured by differential scanning calorimetry as defined in "Handbook of Lipid Bilayers", D Marsh, CRC Press, Boca Raton, Fla., 1990 (pages 137 and 337).

Substantially water-insoluble fabric softening compounds are defined as fabric softening compounds having a solubility of less than $1 \times 10^{-3}$ wt % in demineralised water at 20° C. Preferably the fabric softening compounds have a solubility of less than $1 \times 10^{-4}$ wt %, more preferably less than $1 \times 10^{-8}$ to $1 \times 10^{-6}$ wt %.

Especially preferred are cationic fabric softening compounds that are water-insoluble quaternary ammonium materials having two $C_{12-22}$ alkyl or alkenyl groups connected to the molecule via at least one ester link, preferably two ester links. An especially preferred ester-linked quaternary ammonium material can be represented by the formula:

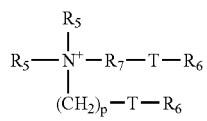

wherein each $R_5$ group is independently selected from $C_{1-4}$ alkyl or hydroxyalkyl groups or $C_{2-4}$ alkenyl groups; each $R_6$ group is independently selected from $C_{8-28}$ alkyl or alkenyl groups; and wherein $R_7$ is a linear or branched alkylene group of 1 to 5 carbon atoms, T is

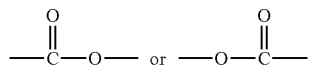

and p is 0 or is an integer from 1 to 5.

Di(tallowoxyloxyethyl) dimethyl ammonium chloride and/or its hardened tallow analogue is an especially preferred compound of this formula.

A second preferred type of quaternary ammonium material can be represented by the formula:

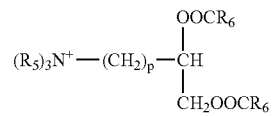

wherein $R_5$, p and $R_6$ are as defined above.

A third preferred type of quaternary ammonium material are those derived from triethanolamine (hereinafter referred to as 'TEA quats') as described in for example U.S. Pat. No. 3,915,867 and represented by formula:

$(TOCH_2CH_2)_3N+(R_9)$ wherein T is H or ($R_8$—CO—) where $R_8$ group is independently selected from $C_{8-28}$ alkyl or alkenyl groups and $R_9$ is $C_{1-4}$ alkyl or hydroxyalkyl groups or $C_{2-4}$ alkenyl groups. For example N-methyl-N,N,N-triethanolamine ditallowester or di-hardened-tallowester quaternary ammonium chloride or methosulphate. Examples of commercially available TEA quats include Rewoquat WE18 and Rewoquat WE20, both partially unsaturated (ex. WITCO), Tetranyl AOT-1, fully saturated (ex. KAO) and Stepantex VP 85, fully saturated (ex. Stepan).

It is advantageous if the quaternary ammonium material is biologically biodegradable.

Preferred materials of this class such as 1,2-bis(hardened tallowoyloxy)-3-trimethylammonium propane chloride and their methods of preparation are, for example, described in U.S. Pat. No. 4,137,180 (Lever Brothers Co). Preferably these materials comprise small amounts of the corresponding monoester as described in U.S. Pat. No. 4,137,180, for example, 1-hardened tallowoyloxy-2-hydroxy-3-trimethylammonium propane chloride.

Other useful cationic softening agents are alkyl pyridinium salts and substituted imidazoline species. Also useful are primary, secondary and tertiary amines and the condensation products of fatty acids with alkylpolyamines.

The compositions may alternatively or additionally contain water-soluble cationic fabric softeners, as described in GB 2 039 556B (Unilever).

The compositions may comprise a cationic fabric softening compound and an oil, for example as disclosed in EP-A-0829531.

The compositions may alternatively or additionally contain nonionic fabric softening agents such as lanolin and derivatives thereof.

Lecithins and other phospholipids are also suitable softening compounds.

In fabric softening compositions nonionic stabilising agent may be present. Suitable nonionic stabilising agents may be present such as linear $C_8$ to $C_{22}$ alcohols alkoxylated with 10 to 20 moles of alkylene oxide, $C_{10}$ to $C_{20}$ alcohols, or mixtures thereof. Other stabilising agents include the deflocculating polymers as described in EP 0415698A2 and EP 0458599 B1.

Advantageously the nonionic stabilising agent is a linear $C_8$ to $C_{22}$ alcohol alkoxylated with 10 to 20 moles of alkylene oxide. Preferably, the level of nonionic stabiliser is within the range from 0.1 to 10% by weight, more preferably from 0.5 to 5% by weight, most preferably from 1 to 4% by weight. The mole ratio of the quaternary ammonium compound and/or other cationic softening agent to the nonionic stabilising agent is suitably within the range from 40:1 to about 1:1, preferably within the range from 18:1 to about 3:1.

The composition can also contain fatty acids, for example $C_8$ to $C_{24}$ alkyl or alkenyl monocarboxylic acids or polymers thereof. Preferably saturated fatty acids are used, in particular, hardened tallow $C_{16}$ to $C_{18}$ fatty acids. Preferably the fatty acid is non-saponified, more preferably the fatty acid is free, for example oleic acid, lauric acid or tallow fatty acid. The level of fatty acid material is preferably more than 0.1% by weight, more preferably more than 0.2% by weight. Concentrated compositions may comprise from 0.5 to 20% by weight of fatty acid, more preferably 1% to 10% by weight. The weight ratio of quaternary ammonium material or other cationic softening agent to fatty acid material is preferably from 10:1 to 1:10.

It is also possible to include certain mono-alkyl cationic surfactants which can be used in main-wash compositions for fabrics. Cationic surfactants that may be used include quaternary ammonium salts of the general formula $R_1R_2R_3R_4N^+$ $X^-$ wherein the R groups are long or short hydrocarbon chains, typically alkyl, hydroxyalkyl or ethoxylated alkyl groups, and X is a counter-ion (for example, compounds in which $R_1$ is a $C_8$–$C_{22}$ alkyl group, preferably a $C_8$–$C_{10}$ or $C_{12}$–$C_{14}$ alkyl group, $R_2$ is a methyl group, and $R_3$ and $R_4$, which may be the same or different, are methyl or hydroxyethyl groups); and cationic esters (for example, choline esters).

The choice of surface-active compound (surfactant), and the amount present, will depend on the intended use of the detergent composition. In fabric washing compositions, different surfactant systems may be chosen, as is well known to the skilled formulator, for handwashing products and for products intended for use in different types of washing machine.

The total amount of surfactant present will also depend on the intended end use and may be as high as 60 wt %, for example, in a composition for washing fabrics by hand. In compositions for machine washing of fabrics, an amount of from 5 to 40 wt % is generally appropriate. Typically the compositions will comprise at least 2 wt % surfactant e.g. 2–60%, preferably 15–40% most preferably 25–35%.

Detergent compositions suitable for use in most automatic fabric washing machines generally contain anionic non-soap surfactant, or non-ionic surfactant, or combinations of the two in any suitable ratio, optionally together with soap.

The compositions of the invention, when used as main wash fabric washing compositions, will generally also contain one or more detergency builders. The total amount of detergency builder in the compositions will typically range from 5 to 80 wt %, preferably from 10 to 60 wt %.

Inorganic builders that may be present include sodium carbonate, if desired in combination with a crystallisation seed for calcium carbonate, as disclosed in GB 1 437 950 (Unilever); crystalline and amorphous aluminosilicates, for example, zeolites as disclosed in GB 1 473 201 (Henkel), amorphous aluminosilicates as disclosed in GB 1 473 202 (Henkel) and mixed crystalline/amorphous aluminosilicates as disclosed in GB 1 470 250 (Procter & Gamble); and layered silicates as disclosed in EP 164 514B (Hoechst). Inorganic phosphate builders, for example, sodium orthophosphate, pyrophosphate and tripolyphosphate are also suitable for use with this invention.

The compositions of the invention preferably contain an alkali metal, preferably sodium, aluminosilicate builder. Sodium aluminosilicates may generally be incorporated in amounts of from 10 to 70% by weight (anhydrous basis), preferably from 25 to 50 wt %.

The alkali metal aluminosilicate may be either crystalline or amorphous or mixtures thereof, having the general formula: $0.8–1.5$ $Na_2O$. $Al_2O_3.0.8–6$ $SiO_2$ These materials contain some bound water and are required to have a calcium ion exchange capacity of at least 50 mg CaO/g. The preferred sodium aluminosilicates contain 1.5–3.5 $siO2$ units (in the formula above). Both the amorphous and the crystalline materials can be prepared readily by reaction between sodium silicate and sodium aluminate, as amply described in the literature. Suitable crystalline sodium aluminosilicate ion-exchange detergency builders are described, for example, in GB 1 429 143 (Procter & Gamble). The preferred sodium aluminosilicates of this type are the well-known commercially available zeolites A and X, and mixtures thereof.

The zeolite may be the commercially available zeolite 4A now widely used in laundry detergent powders. However, according to a preferred embodiment of the invention, the zeolite builder incorporated in the compositions of the invention is maximum aluminium zeolite P (zeolite MAP) as described and claimed in EP 384 070A (Unilever). Zeolite MAP is defined as an alkali metal aluminosilicate of the zeolite P type having a silicon to aluminium weight ratio not exceeding 1.33, preferably within the range of from 0.90 to 1.33, and more preferably within the range of from 0.90 to 1.20.

Especially preferred is zeolite MAP having a silicon to aluminium weight ratio not exceeding 1.07, more preferably about 1.00. The calcium binding capacity of zeolite MAP is generally at least 150 mg CaO per g of anhydrous material.

Organic builders that may be present include polycarboxylate polymers such as polyacrylates, acrylic/maleic copolymers, and acrylic phosphinates; monomeric polycarboxylates such as citrates, gluconates, oxydisuccinates, glycerol mono-, di and trisuccinates, carboxymethyloxy succinates, carboxymethyloxymalonates, dipicolinates, hydroxyethyliminodiacetates, alkyl- and alkenylmalonates and succinates; and sulphonated fatty acid salts. This list is not intended to be exhaustive.

Especially preferred organic builders are citrates, suitably used in amounts of from 5 to 30 wt %, preferably from 10 to 25 wt %; and acrylic polymers, more especially acrylic/maleic copolymers, suitably used in amounts of from 0.5 to 15 wt %, preferably from 1 to 10 wt %.

Builders, both inorganic and organic, are preferably present in alkali metal salt, especially sodium salt, form.

Compositions according to the invention may also suitably contain a bleach system. Fabric washing compositions may desirably contain peroxy bleach compounds, for example, inorganic persalts or organic peroxyacids, capable of yielding hydrogen peroxide in aqueous solution.

Suitable peroxy bleach compounds include organic peroxides such as urea peroxide, and inorganic persalts such as the alkali metal perborates, percarbonates, perphosphates, persilicates and persulphates. Preferred inorganic persalts are sodium perborate monohydrate and tetrahydrate, and sodium percarbonate.

Especially preferred is sodium percarbonate having a protective coating against destabilisation by moisture. Sodium percarbonate having a protective coating comprising sodium metaborate and sodium silicate is disclosed in GB 2 123 044B (Kao).

The peroxy bleach compound is suitably present in an amount of from 0.1 to 35 wt %, preferably from 0.5 to 25 wt %. The peroxy bleach compound may be used in conjunction with a bleach activator (bleach precursor) to improve bleaching action at low wash temperatures. The bleach precursor is suitably present in an amount of from 0.1 to 8 wt %, preferably from 0.5 to 5 wt %.

Preferred bleach precursors are peroxycarboxylic acid precursors, more especially peracetic acid precursors and pernoanoic acid precursors. Especially preferred bleach precursors suitable for use in the present invention are N,N,N',N',-tetracetyl ethylenediamine (TAED) and sodium nonanoyloxybenzene sulphonate (SNOBS). The novel quaternary ammonium and phosphonium bleach precursors disclosed in U.S. Pat. No. 4,751,015 and U.S. Pat. No. 4,818,426 (Lever Brothers Company) and EP 402 971A (Unilever), and the cationic bleach precursors disclosed in EP 284 292A and EP 303 520A (Kao) are also of interest.

The bleach system can be either supplemented with or replaced by a peroxyacid. examples of such peracids can be found in U.S. Pat. No. 4,686,063 and U.S. Pat. No. 5,397,501 (Unilever). A preferred example is the imido peroxycarboxylic class of peracids described in EP A 325 288, EP A 349 940, DE 382 3172 and EP 325 289. A particularly preferred example is phthalimido peroxy caproic acid (PAP). Such peracids are suitably present at 0.1–12%, preferably 0.5–10%.

A bleach stabiliser (transition metal sequestrant) may also be present. Suitable bleach stabilisers include ethylenediamine tetra-acetate (EDTA), the polyphosphonates such as Dequest (Trade Mark) and non-phosphate stabilisers such as EDDS (ethylene diamine di-succinic acid). These bleach stabilisers are also useful for stain removal especially in products containing low levels of bleaching species or no bleaching species.

An especially preferred bleach system comprises a peroxy bleach compound (preferably sodium percarbonate optionally together with a bleach activator), and a transition metal bleach catalyst as described and claimed in EP 458 397A, EP 458 398A and EP 509 787A (Unilever).

The compositions according to the invention may also contain one or more enzyme(s).

Suitable enzymes include the proteases, amylases, cellulases, oxidases, peroxidases and lipases usable for incorporation in detergent compositions. Preferred proteolytic enzymes (proteases) are, catalytically active protein materials which degrade or alter protein types of stains when present as in fabric stains in a hydrolysis reaction. They may be of any suitable origin, such as vegetable, animal, bacterial or yeast origin.

Proteolytic enzymes or proteases of various qualities and origins and having activity in various pH ranges of from 4–12 are available and can be used in the instant invention. Examples of suitable proteolytic enzymes are the subtilisins which are obtained from particular strains of $B.$ $Subtilis$ $B.$ $licheniformis$, such as the commercially available subtilisins Maxatase (Trade Mark), as supplied by Genencor International N.V., Delft, Holland, and Alcalase (Trade Mark), as supplied by Novozymes Industri A/S, Copenhagen, Denmark.

Particularly suitable is a protease obtained from a strain of Bacillus having maximum activity throughout the pH range of 8–12, being commercially available, e.g. from Novozymes Industri A/S under the registered trade-names Esperase (Trade Mark) and Savinase (Trade-Mark). The preparation of these and analogous enzymes is described in GB 1 243 785. Other commercial proteases are Kazusase (Trade Mark obtainable from Showa-Denko of Japan), Optimase (Trade Mark from Miles Kali-Chemie, Hannover, West Germany), and Superase (Trade Mark obtainable from Pfizer of U.S.A.).

Detergency enzymes are commonly employed in granular form in amounts of from about 0.1 to about 3.0 wt %. However, any suitable physical form of enzyme may be used.

The compositions of the invention may contain alkali metal, preferably sodium carbonate, in order to increase detergency and ease processing. Sodium carbonate may suitably be present in amounts ranging from 1 to 60 wt %, preferably from 2 to 40 wt %. However, compositions containing little or no sodium carbonate are also within the scope of the invention.

Powder flow may be improved by the incorporation of a small amount of a powder structurant, for example, a fatty acid (or fatty acid soap), a sugar, an acrylate or acrylate/maleate copolymer, or sodium silicate. One preferred powder structurant is fatty acid soap, suitably present in an amount of from 1 to 5 wt %.

Other materials that may be present in detergent compositions of the invention include sodium silicate; antiredeposition agents such as cellulosic polymers; soil release polymers; inorganic salts such as sodium sulphate; or lather boosters as appropriate; proteolytic and lipolytic enzymes; dyes; coloured speckles; fluorescers and decoupling polymers. This list is not intended to be exhaustive. However, many of these ingredients will be better delivered as benefit agent groups in materials according to the first aspect of the invention.

The detergent composition when diluted in the wash liquor (during a typical wash cycle) will typically give a pH of the wash liquor from 7 to 10.5 for a main wash detergent.

Particulate detergent compositions are suitably prepared by spray-drying a slurry of compatible heat-insensitive ingredients, and then spraying on or post-dosing those ingredients unsuitable for processing via the slurry. The skilled detergent formulator will have no difficulty in deciding which ingredients should be included in the slurry and which should not.

Particulate detergent compositions of the invention preferably have a bulk density of at least 400 g/l, more preferably at least 500 g/l. Especially preferred compositions have bulk densities of at least 650 g/litre, more preferably at least 700 g/litre.

Such powders may be prepared either by post-tower densification of spray-dried powder, or by wholly non-tower methods such as dry mixing and granulation; in both cases a high-speed mixer/granulator may advantageously be used. Processes using high-speed mixer/granulators are disclosed, for example, in EP 340 013A, EP 367 339A, EP 390 251A and EP 420 317A (Unilever).

Liquid detergent compositions can be prepared by admixing the essential and optional ingredients thereof in any desired order to provide compositions containing components in the requisite concentrations. Liquid compositions according to the present invention can also be in compact form which means it will contain a lower level of water compared to a conventional liquid detergent.

Product Forms

Product forms include powders, liquids, gels, tablets, any of which are optionally incorporated in a water-soluble or water dispersible sachet. The means for manufacturing any of the product forms are well known in the art. If the polysaccharide grafted latex particles are to be incorporated in a powder (optionally the powder to be tableted), and whether or not pre-emulsified, they are optionally included in a separate granular component, e.g. also containing a water soluble organic or inorganic material, or in encapsulated form.

Substrate

When used in laundering, the substrate may be any substrate onto which it is desirable to deposit latex particles and which is subjected to treatment such as a washing or rinsing process.

In particular, the substrate may be a textile fabric. It has been found that particular good results are achieved when using a natural fabric substrate such as cotton, or fabric blends containing cotton.

Treatment

The treatment of the substrate with the material of the invention can be made by any suitable method such as washing, soaking or rinsing of the substrate.

Typically the treatment will involve a washing or rinsing method such as treatment in the main wash or rinse cycle of a washing machine and involves contacting the substrate with an aqueous medium comprising the material of the invention.

The present invention will now be explained in more detail by reference to the following non-limiting examples:

In the following examples where percentages are mentioned, this is to be understood as percentage by weight.

EXAMPLES 1–5

These examples give details of the general emulsion polymerisation procedure for preparing core/shell emulsion polymer latex that contains surface grafted LBG. They also show the effect of utilising a chain transfer agent (monothioglycerol) to minimise coagulum formation, maximise monomer conversion and increase deposition during the wash:

Example 1

(No Chain Transfer Agent Used)

Synperonic A20 (1 g) and sodium dodecyl sulphate (0.25 g) were dissolved in de-ionised water (272.9 g), added to a glass reaction flask and heated to 65° C. with stirring. Vinyl acetate (49.95 g) and vinyl anthracene (0.05 g) monomers were dissolved together and 75 wt % of this solution (37.5 g) was added to the reaction flask. Ascorbic acid (1 g) was dissolved in de-ionised water (5 g) and aqueous hydrogen peroxide solution (2.9 g, 35% active) was diluted with de-ionised water (5 g) to give two initiator solutions. 75 wt % of both initiator solutions were added to the reaction flask (i.e. 4.5 g of ascorbic acid and 5.9 g of hydrogen peroxide solutions). Shortly after addition an exotherm was generated which raised the reaction temperature to ~80° C. Once the exotherm subsided (~20 minutes) the temperature was maintained at 70° C. After 45 minutes, the remaining (25 wt %) monomer and locust bean gum (1 g, 2 wt % on monomer)) dissolved in water (150 g) were added to the reaction flask. On addition the temperature fell to ~55° C. The temperature was increased to 65° C. and the remaining 25 wt % of initiator was added to the flask (i.e. 2 g of hydrogen peroxide solution and 1.5 g of ascorbic acid solution). An exotherm of ~4° C. was generated after 10 minutes and the temperature was then maintained at 70° C. for a further 20 minutes. An initiator boost was then added, consisting of aqueous hydrogen peroxide (0.7 g, 35% active) diluted with 5 g of de-ionised water and ascorbic acid (0.25 g) dissolved in de-ionised water (5 g). The polymerisation was allowed to continue for a further 30 minutes. The reaction mixture was then cooled to 30° C. and filtered (through Nylon mesh). The solids content of the final emulsion was ~10% and particle size (via a Malvern Zetasizer) were typically ~200 nm.

Example 2

(0.25 wt % (on Monomer) MTG Present)

The procedure was identical to Example 1, except that 0.25 wt % (on monomer) i.e. 0.125 g of monothioglycerol [(MTG) also known as 3-mercapto-1,2-propanediol] was added to the glass reaction flask (and the de-ionised water amount was correspondingly reduced from 272.9 g to 272.775 g) prior to beginning the polymerisation.

Example 3

(0.5 wt % (on Monomer) MTG Present)

As example 2, except 0.25 g of MTG was added and the de-ionised water level reduced to 272.65 g.

Example 4

(1 wt % (on Monomer) MTG Present)

As example 3, except 0.5 g of MTG was added and the de-ionised water level reduced to 272.4 g.

Example 5

(2 wt % (on Monomer) MTG Present)

As example 4, except 1 g of MTG was added and the de-ionised water level reduced to 271.9 g.

TABLE 1

The Effect of Chain Transfer Agent (MTG) on Coagulum Formation and Monomer Conversion

| Example | Chain Transfer Agent (MTG) Wt. % (on monomer) | Wt. % Coagulum (on polymer solids) | Wt. % Monomer Conversion |
|---|---|---|---|
| 1 | 0 | 13.0 | 81.8 |
| 2 | 0.25 | 0.2 | 90.7 |
| 3 | 0.5 | 0 | 88.8 |
| 4 | 1 | 0 | 68.5 |
| 5 | 2 | 0 | 20.5 |

The result shows that the presence of chain transfer agent (MTG) has a large effect on coagulum level and monomer conversion. Preferred level of MTG was 0.25 wt % on monomer. At this level coagulum was reduced to minimal levels (0.2%) whilst monomer conversion was still maintained at high levels (>90%).

Example 6

Deposition of the polymer particles onto cotton fabric in a model main wash environment was determined. The latexes prepared in examples 1–5 were assessed to ascertain the effect of chain transfer agent (MTG) levels on their deposition ability under model main wash conditions:

Model Main Wash Procedure:

The wash was a model (bottle) wash using a water/shaker bath at 40° C. Cloth was unfluoresced cotton (20×20 cm).

Base and Surfactant stock solutions were prepared as follows:

Base Stock (pH10.5 Buffer)

Sodium Carbonate (Na2CO3)=7.5465 g

Sodium Hydrogen Carbonate (NaHCO$_3$)=2.4195 g

Dissolved in de-ionised water to give 1 litre total volume. (0.1M)

Surfactant Stock

LAS Active Paste=9.09 g (55% Active, Petrelab 550, ex. Petrelab)

Synperonic A7=5 g (ex. ICI)

Dissolved in de-ionised water to give 1 litre total volume (10 g/l)

100 ml of de-ionised water, 12.5 ml of Base stock and 12.5 ml of Surfactant stock (dilutes to 0.01M pH 10.5 buffer and 1 g/l surfactant) were added to a plastic bottle to give the model wash liquor. Each of the LBG grafted poly (vinyl acetate) emulsion latexes (from examples 1–5) were added (to separate wash liquors) to give a concentration of 400 ppm of particles. Washes were done in duplicate for each sample.

400 ppm refers to the level of emulsion particles used. Total wash volume was 125 g and 400 ppm of latex particles were added. e.g. Weight of particles required=125×(400/1×10ˆ6)=0.05 g, but the solids were typically 5%, so the actual weight of emulsion added=0.05/(5/100)=1 g.

The cloth was then added (20×20 cm unfluoresced cotton~1:20 cloth:liquor ratio) and fully submerged. The bottle was shaken for 1 hour at 40° C. in a shaker (water) bath. The cloths were then removed, wrung by hand and allowed to dry overnight. Percentage deposition was calculated by extraction of the deposited polymer particles from the dried cloth as follows:

Deposition via Extraction of Polymer Particles from Washed Cloth:

The deposited particles were extracted from the cloth into tetrahydrofuran (THF). The 20×20 cm cloths were cut into four equal squares and weighed (~1.5 g each in weight) and 10 ml of THF was added to each. They were then agitated overnight on a 'roller' shaker (Stuart Roller SRT2) to dissolve off all polymer particles from the cloth. The level of polymer in the THF solution was then determined by quantitative gel permeation chromatography. The ratio of the determined polymer particle level on cloth to that added initially to the wash solution was used to determine percentage deposition.

For Examples 1–5 the percentage deposition achieved during the model main wash are shown in Table 2.

TABLE 2

% Deposition of Examples 1–5 Achieved under Model Wash Conditions

| Example | Chain Transfer Agent (MTG) Wt. % (on monomer) | % Deposition (on weight of latex particles dosed at the beginning of the wash) |
|---|---|---|
| 1 | 0 | 19.0 |
| 2 | 0.25 | 41.4 |
| 3 | 0.5 | 43.9 |
| 4 | 1 | 40.1 |
| 5 | 2 | 23.4 |

The results show that small levels of chain transfer agent (MTG) double the level of deposition achievable. The chain transfer agent is somewhat pungent and to minimise malodour the preferred level is 0.25 wt % on monomer.

Example 7

The effect of the level of LBG on the particle deposition during model washes was assessed. Particles containing varies levels of surface grafted LBG were prepared as using the procedure given in Example 1. The LBG level used in example 1 was 1 g (2 wt % on monomer). Further latexes were prepared using 0.25, 0.5, 0.75, 1.5 and 2.5 g of LBG, corresponding respectively to 0.5, 1, 1.5, 3 and 5 wt % LBG on monomer. A control containing no LBG was also prepared. There deposition to cotton under model wash conditions was determined using the wash and analysis procedure given in Example 6. The results are shown in Table 3.

TABLE 3

The Effect of the Level of LBG on % Deposition under Model Wash

| Wt. % LBG (on monomer) | % Deposition (on weight of latex particles dosed at the beginning of the wash) |
|---|---|
| 0 | 4.1 |
| 0.5 | 11.1 |
| 1 | 14.7 |
| 1.5 | 15.0 |
| 2 | 23.3 |
| 3 | 25.2 |
| 5 | 26.3 |

The results show that the deposition efficacy increases with increasing LBG level. The preferred LBG level is 2 wt. % on monomer, as higher levels led to excessive coagulation and reduced monomer conversion.

Example 8

The effect of adding the LBG during the formation of the particles via emulsion polymerisation, as opposed to simply adding the LBG to the particles after their complete formation was evaluated. One latex was prepared using the procedure given in Example 2, whereby 75 wt. % of monomer was allowed to polymerise and the LBG was added with the remaining 25 wt. % of monomer and initiator ('In-Situ' LBG grafted latex). A control latex containing no LBG was also prepared (as Example 2, but with LBG omitted). A third latex was prepared following Example 2, except that the LBG (and the associated 150 g de-ionised water which was used for solubilisation) was not added until the emulsion polymerisation was complete and the latex allowed to cool to room temperature. The LBG component was then simply poured into the latex and allowed to stir for 30 minutes (Post Added LBG latex). There deposition to cotton under model wash conditions was determined using the wash and analysis procedure given in Example 6. The results are shown in Table 4.

TABLE 4

The % Deposition after Model Wash for Contol, 'In-situ' Grafted and Post Added LBG

| Sample | % Deposition (on weight of latex particles dosed at the beginning of the wash) |
| --- | --- |
| Control | 4.1 |
| 'In-situ' LBG grafted latex | 41.4 |
| Post Added LBG latex | 3.7 |

The results show that high levels of deposition are achievable only when the LBG is added during the preparation of the particles. Simply post adding LBG to pre-prepared poly (vinyl acetate) particles gave no wash deposition benefits.

Example 9

The differences in model wash deposition levels for a number of LBG grafted particles made with various free radically polymerisable monomers was evaluated. A LBG grafted latex was prepared using the procedure given in Example 2. Further latexes were prepared where the vinyl acetate was substituted with styrene, methyl methacrylate or butyl acrylate. There deposition to cotton under model wash conditions was determined using the wash and analysis procedure given in Example 6. The results are shown in Table 5.

TABLE 5

The Effect of Monomer Type on the Model Wash Deposition of LBG grafted Particles

| LBG grafted Particles based on: | % Deposition (on weight of latex particles dosed at the beginning of the wash) |
| --- | --- |
| Poly (Vinyl Acetate) | 41.4 |
| Poly (Butyl Acrylate) | 35.6 |
| Poly (Methyl Methacrylate) | 29.7 |
| Poly (Styrene) | 23.2 |

The results show that the model wash deposition efficacy was dependent on monomer type. LBG grafted Poly (vinyl acetate) gave the greatest wash deposition and is the preferred monomer.

Example 10

A number of alternative $\beta_{1-4}$ polysaccharides (guar gum, tara gum, xyloglucan and hydroxyethyl cellulose) were grafted onto particles and their deposition to cotton during model washing was assessed.

Synthesis of Guar Gum, Tara Gum, Xyloglucan and Hydroxyethyl Cellulose grafted particles:

The particles were synthesised following the method given in Example 2, except locust bean gum was substituted with guar gum or tara gum or xyloglucan or hydroxyethyl cellulose. A control latex was also prepared using an identical technique, except no polysaccharide was added.

Wash Deposition of Alternative Polysaccharides:

The deposition of these latexes was assessed using the procedure detailed in Example 6, except percentage deposition was not assessed via extraction of the deposited polymer from the washed cloth, but by the depletion in fluorescence of the wash solution after the wash, as detailed below:

A small aliquot (5 ml) of the wash solution was taken before the wash began and the fluorescence determined using a luminescence spectrophotometer (Perkin Elmer LS 50). Excitation wavelength was 267 nm and emission wavelength was 405 nm (Slit width=4 for both). After the wash was complete, the fluorescence was again measured (same conditions) and the fall in fluorescence (with respect to the pre-wash level) was used to determine % deposition [% depo=(fluor. pre-wash–fluor. post wash)/fluor. pre-wash) *100].

The deposition results are shown in Table 6.

TABLE 6

Deposition of Alternative Polysaccharide Grafted Particles

| Particles Grafted With: | % Deposition (on weight of latex particles dosed at the beginning of the wash) |
| --- | --- |
| No Polysaccharide (Control) | 6.5 |
| Guar Gum | 10.9 |
| Tara Gum | 35.6 |
| Xyloglucan | 39.5 |
| Hydroxyethyl Cellulose | 18.7 |

The results show that all the alternative polysaccharide grafted particles gave greater deposition (to varying degrees) than the control particles.

Example 11

In order to facilitate greater grafting of the LBG chains onto the particles, the LBG polymer was modified by a number of routes prior to its use in the emulsion polymerisation of the particles. Modifications involved covalently attaching thiol (LBG-SH) and hydrophobic (LBG-C12) functionality to the LBG polymer.

Procedure for Adding Thiol Functionality to the LBG Polymer:

LBG (20 g) was dissolved in dimethylsulfoxide (100 ml) by heating to 80° C. Once dissolved and cooled to room temperature, thiobutyrolactone (0.858 ml) was added and the reaction mixture was stirred overnight. The polymer was precipitated into an excess of acetone, filtered, washed with acetone and dried in a vacuum oven. A slightly pink solid was obtained (LBG-SH).

Procedure for Adding Hydrophobic Chains to the LBG Polymer:

LBG (20 g) was dissolved in dimethylacetamide (80 ml) by heating to 80° C. (under a nitrogen purge). Diisopropyl carbodiimide (5.68 g) was added and the mixture was stirred at 80° C. for 2 hours. Lauric acid (9.03 g) was dissolved in dimethylacetamide (20 ml) and added to the reaction flask. The mixture was stirred at 50° C. overnight. After cooling, the polymer was precipitated into an excess of acetone, filtered, washed (via Soxhlet extraction with acetone) and dried in a vacuum oven. A white solid was obtained (LBG-C12).

Both the LBG thiol and C12 hydrophobe were used in the preparation of poly (vinyl acetate) emulsion polymerisation particles. A latex was prepared using the procedure given in Example 2, except no LBG was added (control). Further latexes were prepared with the modified LBGs using the same procedure, except the LBG was substituted for LBG- SH for the thiol system and LBG-C12 (which was added to the reaction vessel at the beginning of the polymerisation) for the hydrophobe variant. There deposition to cotton under model wash conditions was determined using the wash and analysis procedure given in Example 6. The results are shown in Table 7.

TABLE 7

Deposition levels for Thiol and Hydrophobically Modified LBG under Model Wash Conditions

| Sample: Poly (Vinyl Acetate) particles made with: | % Deposition (on weight of latex particles dosed at the beginning of the wash) |
|---|---|
| Control (No LBG) | 2.9 |
| LBG-SH | 29.6 |
| LBG-C12 | 53.8 |

The results show that the thiol and hydrophobe modified LBGs give deposition levels far greater than that achieved from the control particles which do not have LBG.

Example 12

The deposition onto cotton of LBG grafted poly (vinyl acetate) particles during a 40° C. cotton wash, in a domestic washing machine (European front loading) was assessed. The wash procedure was as follows:

500 g of cotton sheeting (9 sheets of ~40×95 cm dimensions) was added to a Miele washing machine (Miele Novotronic W916). 20 g of Persil Performance was added to the washing powder dispenser draw. The 40° C. cotton wash cycle was selected and the wash began. As the machine washed the powder from the dispenser draw, 50 g of LBG grafted poly (vinyl acetate) latex, as prepared in Example 2, was added. The solid content of the latex was 10 wt. % which equates to 1 wt % of particles on weight of fabric. After the wash was complete the fabric was removed and dried in a Miele tumble drier (Miele Novotronic T430) using the cotton drying cycle. The fabric was then ironed (cotton setting with steam using a Philips Elance 24 iron). A control wash was also conducted using this procedure. In this case, the latex added to the dispenser drawer at the beginning of the wash contained no locust bean gum (synthesis as Example 2 but LBG omitted).

The amount of particles deposited from the wash was assessed for both control and LBG grafted poly (vinyl acetate) treated fabrics (using randomly chosen 20×20 cm fabric squares). The extraction analysis procedure was identical to that detailed in Example 6. The results are shown in Table 8.

TABLE 8

% Deposition of Control and LBG Grafted Poly (Vinyl Acetate) Particles Applied from a Domestic Washing Machine

| Sample | % Deposition (on weight of latex particles dosed at the beginning of the wash) |
|---|---|
| Poly (vinyl acetate) control particles | 0.3 |
| LBG grafted poly (vinyl acetate) particles | 34.4 |

The results show that the delivery from a domestic washing machine of the LBG grafted particles is much greater than the control particles.

Example 13

The stiffening of cotton fabric due to wash deposited LBG-PVAc particles was evaluated. The washes were conducted in a domestic washing machine using a similar procedure to that in Example 11, except that the control wash was conducted using only Persil Performance and no latex was dosed. Also, after the initial wash was complete a test fabric sample was taken (20×20 cm) and the remaining wash load was washed (using the same procedure) a further four times.

The effect the deposited particles had on fabric stiffness after 1 and 5 washes was assessed using a Shirley Fabric Stiffness Tester (ex. Shirley Developments Ltd.) following the procedure outlined in ASTM D1388. This method involves pushing the fabric over an edge and allowing it to drape to a fixed angle, which gives a bending length (in cm). The greater the bending length the stiffer the fabric. The bending lengths are shown in Table 9.

TABLE 9

Bending Lengths for Persil Control and LBG Grafted Poly (Vinyl Acetate) Particles after 1 and 5 Machine Washes

| Sample | Bending Length (cm) |
|---|---|
| Control (Persil Only) Wash 1 | 1.63 |
| LBG grafted poly (vinyl acetate) particles Wash 1 | 2.11 |
| LBG grafted poly (vinyl acetate) particles Wash 5 | 2.92 |

The results show that compared to a Persil washed control the LBG grafted poly (vinyl acetate) particles exhibit increased fabric stiffness (crispness) after 1 wash and this can be enhanced further by subsequent washes.

The invention claimed is:

1. A process for the preparation of polysaccharide grafted latex particles wherein the polysaccharide has β-1,4 linkages, wherein the process for production is core/shell emulsion polymerisation, comprising the steps of:
    (a) allowing approximately 50 to 99.9 wt. % of latex monomer to polymerise, and
    (b) adding the remaining latex monomer and the polysaccharide, to give a shell containing polysaccharide grafts at the latex particle surface.

2. The process of claim 1 wherein an initiator is used.

3. The process of claim 1, wherein the polysaccharide has β-1,4 linkages and the process comprises a single step of preparing the latex particles by emulsion polymerisation of latex monomers with the simultaneous grafting of the polysaccharide.

4. The process of claim 3 wherein the latex monomers are suitable for free radical aqueous emulsion polymerisation and contain at least one ethylenically unsaturated group capable of undergoing free radical addition polymerisation.

5. The process of claim 1 wherein the latex monomers are chosen from the following: olefins, ethylene, vinylaromatic monomers, esters of vinyl alcohol and monocarboxylic acids, esters of α,β-monoethylenically unsaturated mono- and dicarboxylic acids with alcohols, dimethyl or di-n-butyl maleate, nitriles of α,β-monoethylenically unsaturated carboxylic acids, conjugated dienes, α,β-monoethylenically unsaturated monocarboxylic and dicarboxylic acids and their amides, vinyl-sulfonic acid and its water-soluble salts, and/or alkylene glycol diacrylates and dimethacrylates.

6. The process of claim 4 wherein the latex monomers are chosen from the following: styrene, α-methylstyrene, o-chlorostyrene, vinyltoluenes, vinyl acetate, vinyl propionate, vinyl n-butyrate, vinyl laurate, vinyl stearate, esters of acrylic, methacrylic, maleic, fumaric or itaconic acid with methyl, ethyl, n-butyl, isobutyl or 2-ethylhexyl alcohol, acrylonitrile, 1,3-butadiene, isoprene, acrylic acid, methacrylic acid, maleic acid, fumaric acid, itaconic acid, acrylamide, methacrylamide, poly(alkylene oxide) monoacrylates and monomethacrylates, N-vinyl-pyrrolidone, ethylene glycol diacrylate, 1,2-propylene glycol diacrylate, 1,3-propylene glycol diacrylate, 1,3-butylene glycol diacrylate, 1,4-butylene glycol diacrylates, ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate, and/or triallyl cyanurate.

7. The process of claim 1 wherein the polysaccharide is present at levels between 0.1% to 10% w/w of the latex monomer, preferably 2% w/w of monomer.

8. The process of claim 1 wherein 75 wt % of monomer is added prior to the addition of the polysaccharide.

9. The process of claim 8 wherein the remaining monomer and an initiator are added with the polysaccharide.

10. The process of claim 1 wherein the polysaccharide is locust bean gum.

11. The process of claim 1 wherein a chain transfer agent is used.

12. The process of claim 11 wherein 0.25% w/w based on the monomer of the chain transfer agent is used.

13. The process of claim 11 wherein the chain transfer agent is monothioglycerol, n-dodecyl mercaptan and/or 2-mercaptoethanol.

14. The process of claim 2 wherein the initiator is benzoyl peroxide, t-butyl peroxide, hydrogen peroxide, azobisisobutyronitrile, ammonium persulphate, 2,2'-azobis (cyanopropane), benzophenone, benzoin, ammonium persulphate/sodium metabisulphite mixture, cumyl hydroperoxide/ferrous ion mixture and/or asorbic acid/hydrogen peroxide mixture.

15. The process of claim 1 wherein the β-1,4 polysaccharide is chemically reacted to add thiol or hydrophobe chain functionality, prior to use in the emulsion polymerisation process.

16. The process of claim 1 further comprising adding an additional fabric benefit agent to the particles.

17. The process of claim 16 wherein the fabric benefit agent is selected from the following a fabric softener, ease of ironing aid, lubricants, crease reduction agents, fluorescers, sunscreens, photofading inhibitors, fungicides, insect repellents.

18. A method of treating fabric, comprising the steps of forming a grafted polysaccharide particle by the process of claim 1 and then applying said particle to a fabric.

19. A method of stiffening fabric comprising the step of forming a grafted polysaccharide particle by the process of claim 1 and then applying said particle to the fabric.

20. A polysaccharide grafted latex core/shell particle wherein the polysaccharide has β-1,4 linkages and the latex monomers are suitable for free radical aqueous emulsion polymerisation and contain at least one ethylenically unsaturated group capable of undergoing addition polymerisation, wherein the core contains an additional fabric benefit agent.

21. The polysaccharide grafted latex particle of claim 20 wherein the latex monomers are chosen from the following: olefins, ethylene, vinylaromatic monomers, esters of vinyl alcohol and monocarboxylic acids, esters of α,β-monoethylenically unsaturated mono- and dicarboxylic acids with alcohols, dimethyl or di-n-butyl maleate, nitriles of α,β-monoethylenically unsaturated carboxylic acids, and/or conjugated dienes, α,β-monoethylenically unsaturated monocarboxylic and dicarboxylic acids and their amides, vinyl-sulfonic acid and its water-soluble salts, and/or alkylene glycol diacrylates and dimethacrylates.

22. The polysaccharide grafted latex particle of claim 21 wherein the latex monomers are chosen from the following: styrene, α-methylstyrene, o-chlorostyrene, vinyltoluenes, vinyl acetate, vinyl propionate, vinyl n-butyrate, vinyl laurate, vinyl stearate, esters of acrylic, methacrylic, maleic, fumaric or itaconic acid with methyl, ethyl, n-butyl, isobutyl or 2-ethylhexyl alcohol, acrylonitrile, 1,3-butadiene and/or isoprene, acrylic acid, methacrylic acid, maleic acid, fumaric acid, itaconic acid, acrylamide, methacrylamide, poly (alkylene oxide) monoacrylates and monomethacrylates, N-vinyl-pyrrolidone, ethylene glycol diacrylate, 1,2-propylene glycol diacrylate, 1,3-propylene glycol diacrylate, 1,3-butylene glycol diacrylate, 1,4-butylene glycol diacrylates, ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate, and/or triallyl cyanurate.

23. The polysaccharide grafted latex particle of claim 20 wherein the fabric benefit agent is selected from the following a fabric softener, lubricants, crease reduction agents, fluorescers, sunscreens, photofading inhibitors, fungicides, insect repellents.

24. A laundry treatment composition comprising the polysaccharide grafted particle obtainable by the process of claim 1.

25. A method of stiffening fabric comprising the steps of applying the polysaccharide grafted latex particle of claim 20 to the fabric.

* * * * *